United States Patent
Home

[19]

[11] Patent Number: 5,623,866
[45] Date of Patent: Apr. 29, 1997

[54] SUPPORT BRACKET FOR A GRILL BOWL

[76] Inventor: William Home, 9th F1/3, No. 374, Sec. 2, Pa-Teh Road, Taipei, Taiwan

[21] Appl. No.: 694,305

[22] Filed: Aug. 8, 1996

[51] Int. Cl.[6] .................................................. A47J 37/00
[52] U.S. Cl. ........................ 99/444; 99/400; 99/446; 126/9 R; 126/25 R; 126/41 R; 248/188; 248/214
[58] Field of Search ............................ 99/339, 340, 400, 99/401, 444–446, 448–450, 481, 482; 126/25 R, 9 R, 41 R; 248/188, 214, 314, 315, 154, 243, 343, 239, 158, 432, 439

[56] References Cited

U.S. PATENT DOCUMENTS

| | | | |
|---|---|---|---|
| 3,559,565 | 2/1971 | Getz | 99/340 |
| 4,322,049 | 3/1982 | Holland et al. | 126/35 R |
| 4,338,912 | 7/1982 | Gaskins | 126/9 R |
| 4,762,059 | 8/1988 | Mclane, Sr. | 99/446 X |
| 4,955,358 | 9/1990 | Harris et al. | 248/188 X |
| 4,972,766 | 11/1990 | Anetsberger | 99/449 X |
| 5,070,776 | 12/1991 | Schlosser et al. | 99/450 |
| 5,070,857 | 12/1991 | Sarten | 126/25 R |
| 5,076,256 | 12/1991 | Raymer et al. | 126/41 R |
| 5,090,398 | 2/1992 | Raymer et al. | 248/188 X |
| 5,213,027 | 5/1993 | Tsotsos | 99/339 |
| 5,333,540 | 8/1994 | Mazzocchi | 99/446 X |
| 5,472,164 | 12/1995 | Contee, Jr. | 248/214 |

*Primary Examiner*—Timothy F. Simone
*Attorney, Agent, or Firm*—Morton J. Rosenberg; David I. Klein

[57] ABSTRACT

In an outdoor gas grill having a grill bowl, a pair of support brackets supporting the grill bowl, a pair of side tables, a grease tray and four cart legs each having a hole at an upper end thereof, the support brackets each being a generally H-shaped member having two vertical pillars and a beam formed between the two vertical pillars, the beam being an elongated member having a plurality of ventilation openings, the elongated member being formed at a top with a pair of inwardly extending shoulders for supporting the grill bowl and at a bottom with a pair of inwardly extending lugs for receiving the grease tray, each of the legs having a lower end provided with a spring-loaded ball adapted to engage with the hole of a respective cart leg.

2 Claims, 5 Drawing Sheets

SUPPORT BRACKET FOR A GRILL BOWL

BACKGROUND OF THE INVENTION

1. Field of the Invention

This invention is related to a support bracket for a grill bowl and in particular to one which can facilitate the fixation of a grill bowl.

2. Description of the Prior Art

It has been found that the conventional support bracket for a grill bowl is simply a generally U-shaped member which is fixedly mounted on cart legs of an outdoor gas grill by screws thereby causing much inconvenience (see FIG. 7). In addition, such a support bracket is made by welding pieces of sheet metal together and so it is necessary to be further processed before use.

Therefore, it is an object of the present invention to provide an improved support bracket for a grill bowl which can obviate and mitigate the above-mentioned drawbacks.

SUMMARY OF THE INVENTION

This invention relates to an improved support bracket for a grill bowl.

It is the primary object of the present invention to provide a support bracket which can facilitate the fixation of a grill bowl.

It is another object of the present invention to provide a support bracket for a grill bowl which can be easily connected with cart legs.

It is still another object of the present invention to provide a support bracket for a grill bowl which can be conveniently connected with two side tables.

It is still another object of the present invention to provide a support bracket for a grill bowl which is injection molded from aluminum.

It is still object of the present invention to provide a support bracket for a grill bowl which is easy and cheap to manufacture.

It is a further object of the present invention to provide a support bracket for a grill bowl which is simple and sturdy in construction.

Other objects of the-invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
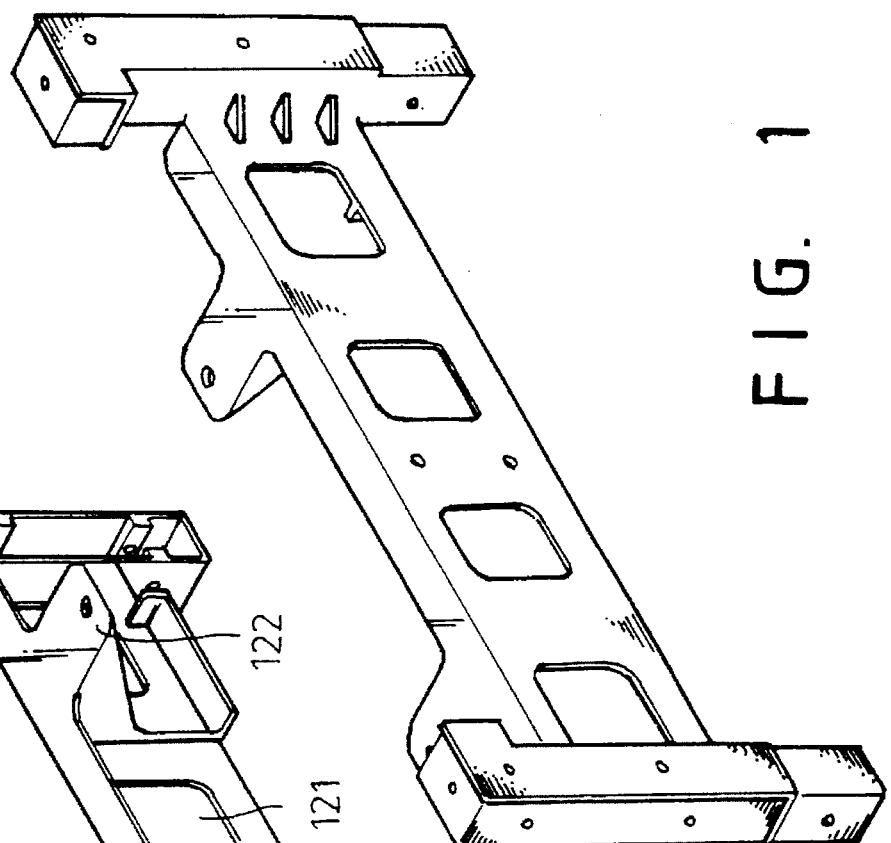
FIG. 1 is a front perspective view of a support bracket according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
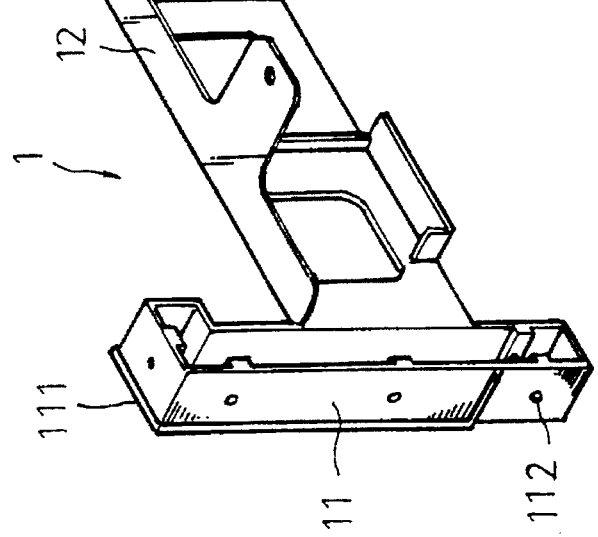
FIG. 2 is a rear perspective view of the support bracket.
Figure 3:
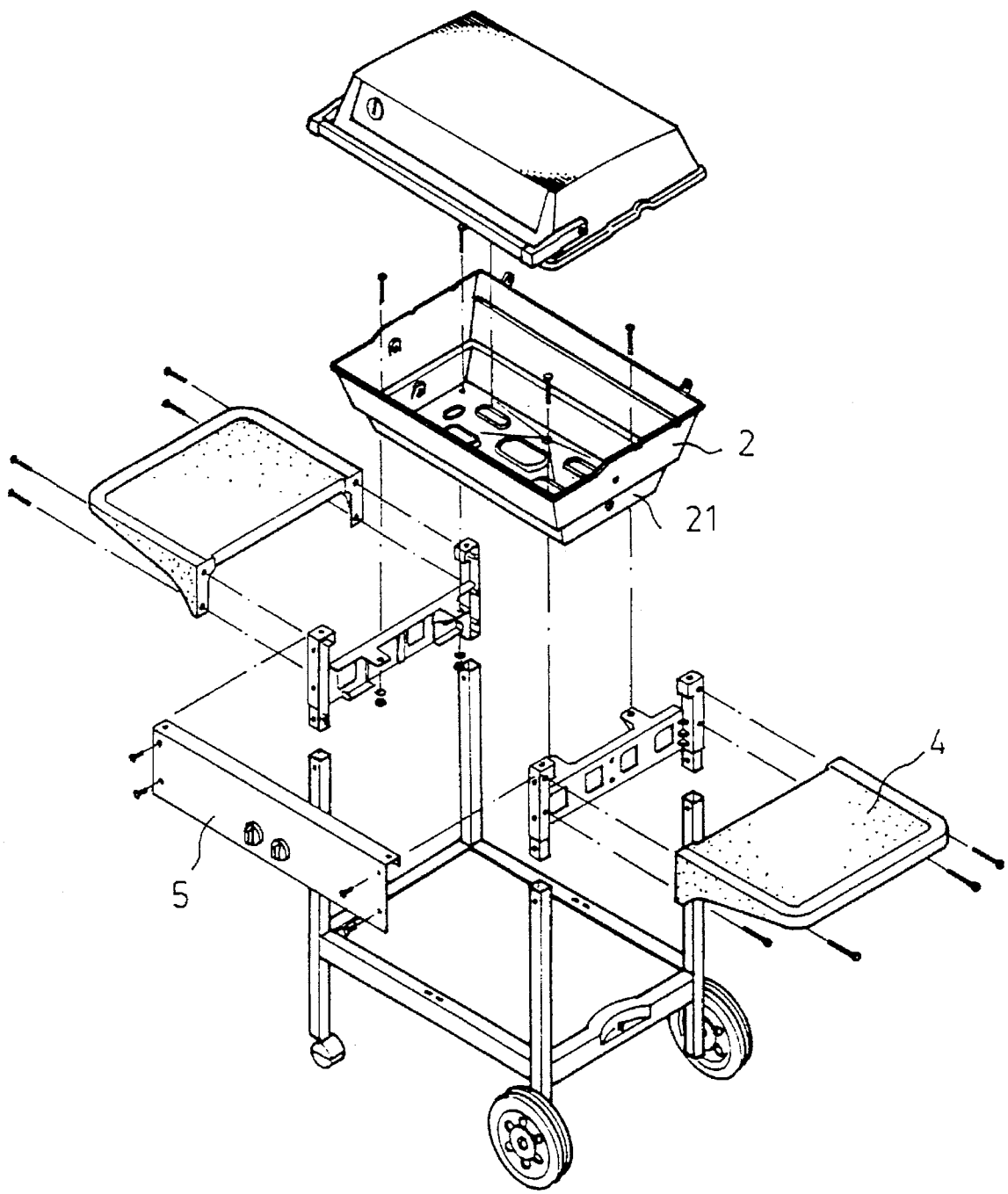
FIG. 3 is an exploded view of an outdoor gas grill provided with the support bracket according to the present invention.
Figure 4:
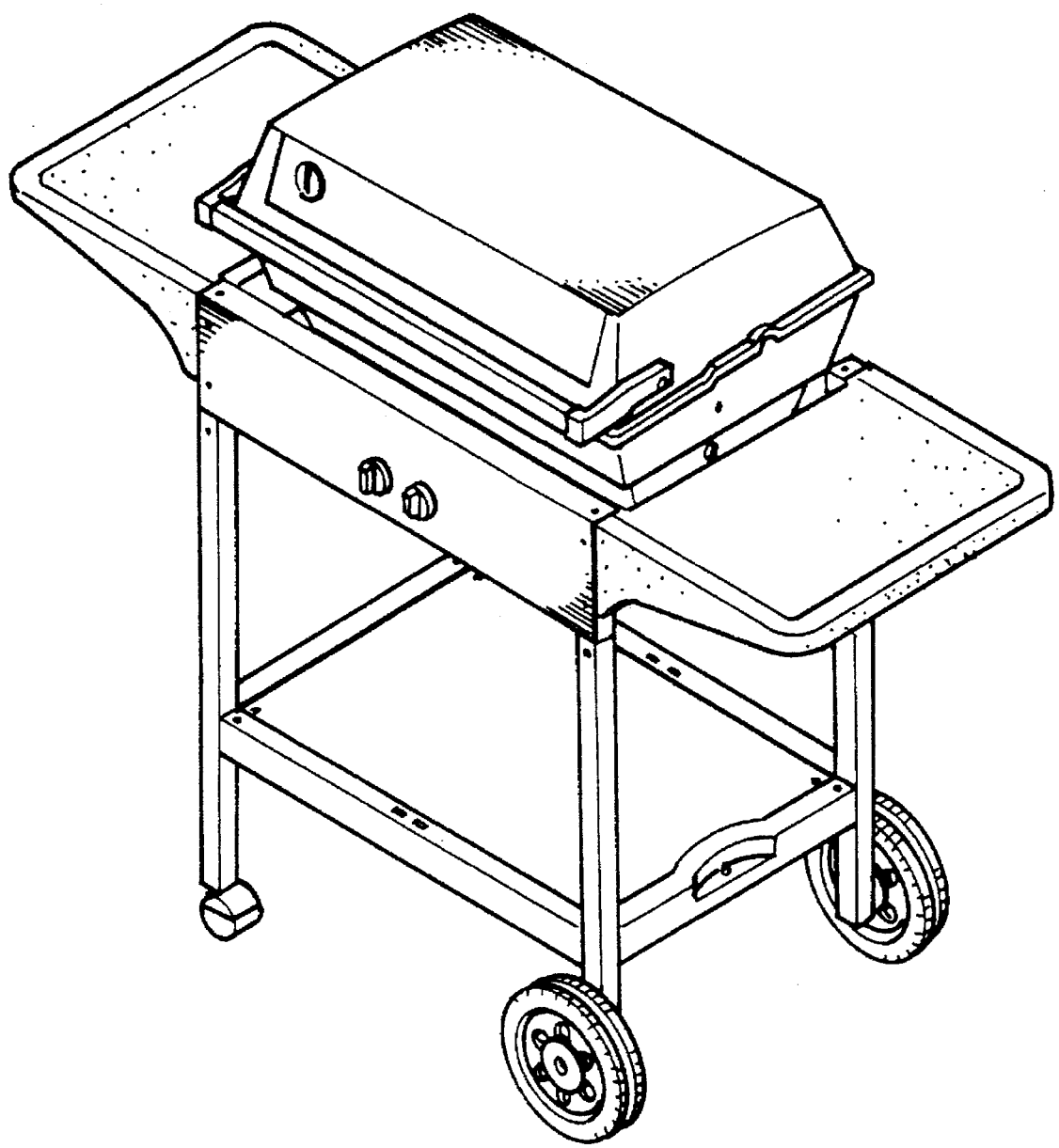
FIG. 4 is a perspective view of the outdoor gas grill shown in FIG. 3.
Figures 5, 6:
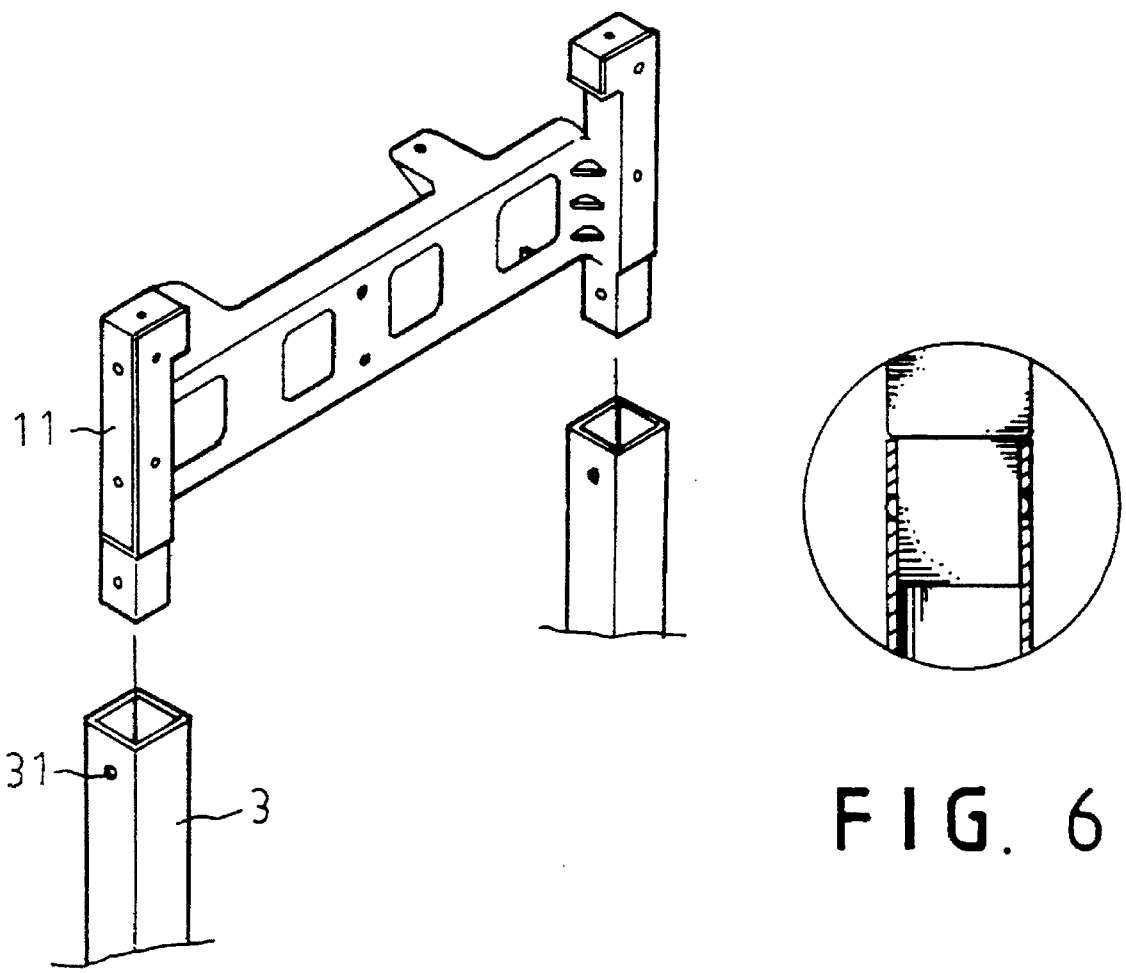
FIG. 5 illustrates how to connect cart legs with the support bracket.
FIG. 6 is an enlarged sectional view showing the engagement between the cart leg and the support bracket.
Figure 7:
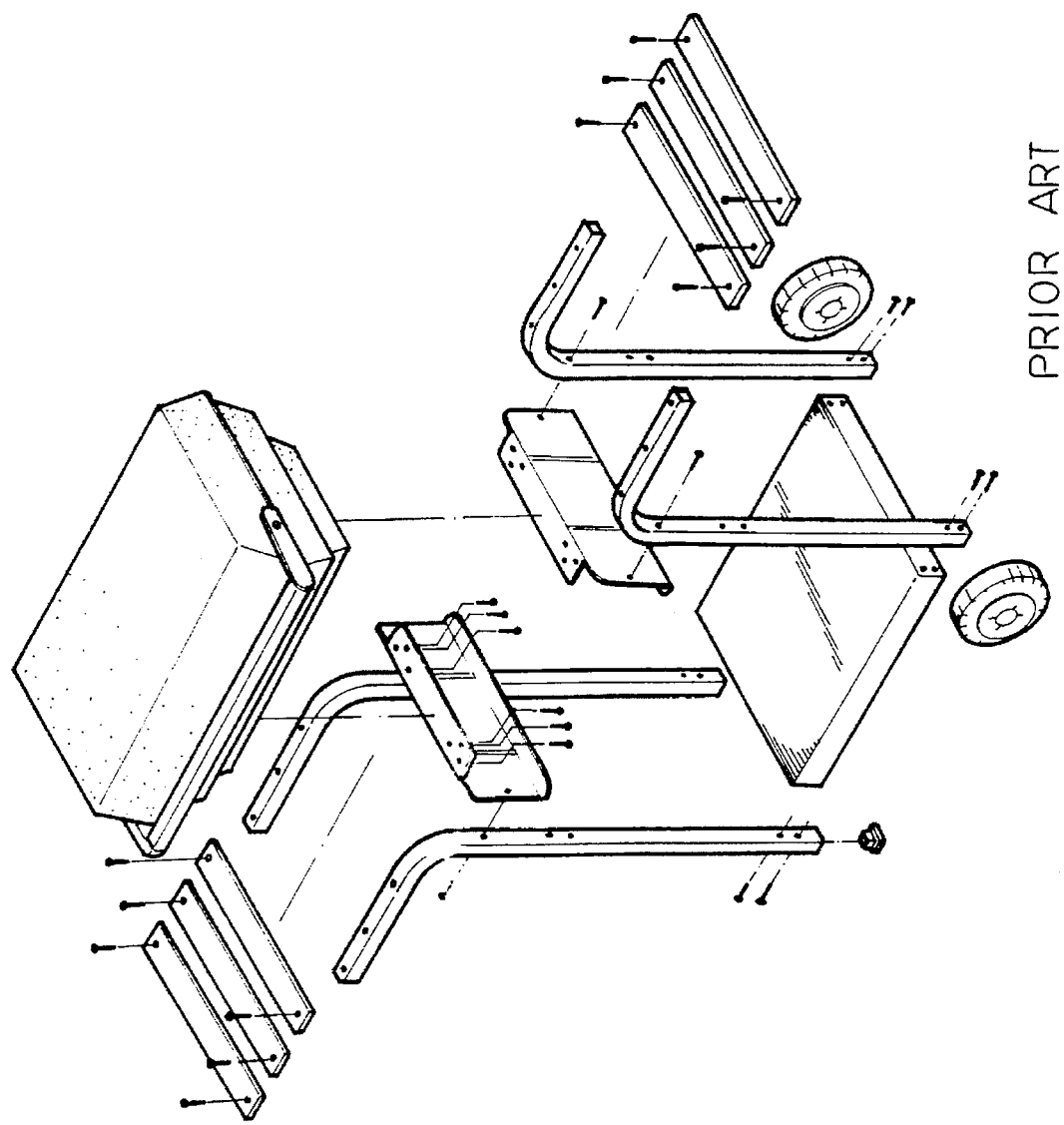
FIG. 7 is an exploded view of a prior art outdoor gas grill.

With reference to the drawings and in particular to FIGS. 1, 2 and 3 thereof, the support bracket 1 for a grill bowl 2 of an outdoor gas grill is a generally H-shaped member which has two vertical pillars 11 and a beam 12 between the two vertical pillars 11. The vertical pillar 11 is formed with a flange 111 at its outer side. The lower end of the vertical pillar 11 is provided with a spring-loaded ball 112 adapted to engage with a hole 31 of a cart leg 3 (see FIGS. 5 and 6). The spring-loaded ball 112 may be of any conventional design well known to the art and is not considered a part of the invention. The beam 12 is an elongated member having a plurality of ventilation holes 121, allowing air to enter and move through to provide oxygen for the combustion chamber of the gas bowl 2. Further, the beam 12 is provided at the top with a pair of inwardly extending shoulders 122 for supporting the bottom 21 of the grill bowl 2 (see FIG. 3), and at the bottom with a pair of lugs 123 for receiving a grease tray (not shown).

When in use, the lower ends of a pair of support brackets 1 are each inserted into an upper end of a cart leg 3 so that the spring-loaded ball 112 of the pillar 11 is engaged with the hole 31 of the cart leg 3. Then, the grill bowl 2 is fixedly mounted on the shoulders 122 of the support brackets 1 by screws (shown but not numbered). The flanges 111 of the support brackets 1 make it easier to arrange the grill bowl 2 in the predetermined position. Two side tables 4 are each installed on the outer side of one of the support brackets 1 by screws (shown but not numbered). A control panel 5 is arranged on the pillars 11 of the support brackets i by screws, with its two vertical side edges and bottom edge in contact with the flanges 111. The flanges 111 are used for making the positioning of the control panel 5 easier.

The support bracket 1 is injection molded from aluminum so that it is unnecessary to be further processed before use thus making it easy and cheap to manufacture.

Accordingly, the support bracket for a grill bowl according to the present invention has the following major advantages:

1. Facilitating the assembly of an outdoor gas grill.
2. Easy and cheap to manufacture.
3. Simple and sturdy in construction.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. In an outdoor gas grill having a grill bowl, a pair of support brackets supporting the grill bowl, a pair of side tables, a grease tray and four cart legs each having a hole at an upper end thereof, said support brackets each being a generally H-shaped member having two vertical pillars and a beam formed between said two vertical pillars, said beam being an elongated member having a plurality of ventilation openings, said elongated member being formed at a top with a pair of inwardly extending shoulders for supporting said grill bowl and at a bottom with a pair of inwardly extending lugs for receiving said grease tray, each of said legs having a lower end provided with a spring-loaded ball adapted to engage with the hole of a respective cart leg.

2. The support brackets as claimed in claim 1, being injection-molded from aluminum.

* * * * *